(12) United States Patent
Brown et al.

(10) Patent No.: US 6,290,786 B1
(45) Date of Patent: *Sep. 18, 2001

(54) METHOD AND APPARATUS FOR COATING THE SEAMS OF WELDED TUBES

(75) Inventors: Curt Brown, Park Forest; Theodore Krengel, Flossmoore, both of IL (US)

(73) Assignee: The IDOD Trust, Grant Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/337,903

(22) Filed: Jun. 22, 1999

Related U.S. Application Data (63) Continuation-in-part of application No. 09/106,397, filed on Jun. 29, 1998, now Pat. No. 6,042,659.

(51) Int. Cl.$^7$ ..................................................... C21D 9/08
(52) U.S. Cl. .................... 148/519; 148/520; 148/521; 228/150; 228/199; 228/202; 228/223
(58) Field of Search .................................. 148/519, 520, 148/521; 228/147, 150, 199, 202, 223

(56) References Cited

U.S. PATENT DOCUMENTS

| | | | |
|---|---|---|---|
| 3,582,599 | * 6/1971 | Yohn | 219/60 R |
| 5,474,227 | * 12/1995 | Krengel et al. | 228/147 |
| 5,732,874 | * 3/1998 | Borzym et al. | 228/147 |
| 6,018,859 | * 2/2000 | Borzym et al. | 228/147 |
| 6,042,659 | * 3/2000 | Brown et al. | 148/519 |

* cited by examiner

Primary Examiner—George Wyszomierski
(74) Attorney, Agent, or Firm—Howard & Howard (57) ABSTRACT

The method for coating the seam of a welded tube of this invention includes applying a mixture of the desired protective metal coating in powdered form and a liquid flux over the internal surface of the welded seam with the welded seam located in a lower portion of the tube, then heating the welded seam to the melting temperature of the protective metal coating, melting the metal coating which flows over the seam forming an adherent metallurgical bond. The preferred apparatus includes a wand which extends between the opposed edges of the open seam tube in the welding apparatus and extends axially through the tube to overlie the welded seam spaced from the welding apparatus. The wand includes three conduits transmitting the powdered protective metal coating, liquid flux and nonoxidizing gas to the applicator which includes a nozzle which atomizes and sprays the liquid flux over the internal surface of the seam and which combines with the powdered protective metal coating to form a paste.

16 Claims, 3 Drawing Sheets

METHOD AND APPARATUS FOR COATING THE SEAMS OF WELDED TUBES

RELATED APPLICATIONS

This application is a continuation in part application of Ser. No. 09/106,397 filed Jun. 29, 1998, now U.S. Pat. No 6,042,659.

BACKGROUND OF THE INVENTION

The present invention relates to improved methods and apparatus for coating the inner exposed surface of the seam of a welded metal tube with a protective metal coating. The tube may be formed from a coated metal strip such as a ferrous strip having a coating of zinc or aluminum or various alloys. However, the coating on the surface of the seam will burn off or vaporize during welding because the melting temperature of the coating, such as zinc or aluminum and their alloys, has a much lower melting temperature than the tube which is generally formed of steel. More specifically, the improved method and apparatus of this invention utilizes a unique coating and heating process which results in an improved bond between the protective metal coating and the exposed seam surface which extends the life of the tube.

Methods of continuous or in-line forming of seamed metal tubes such as steel from a continuous strip are well known. In a conventional tube forming mill, the strip is rolled to form an open seam tube having nearly abutting edges located at the top of the tube. The edges are then welded together by one of several conventional methods which generally include heating the edges and then either forging the edges together with squeeze rolls and/or flux welding a seam. The edges of the tube may be heated, for example, by resistance welding, electric arc or by high frequency induction welding. High frequency induction welding is a form of electronic resistance welding, wherein the open seam tube is received through an electric work coil which creates a strong magnetic field, which in turn induces a current to flow around the tube and in the "Vee" formed as the edges of the strip are welded. An impeder is generally located within the tube, which forces the current down the nearly abutting edges of the open seam tube, heating the tube edges to the hot forging temperature. The tube edges are then forged by squeeze rolls which drive the molten edges of the open seam tube together to form an integral seam.

In-line galvanizing and coating or painting processes which apply a protective coating to the tube are also well known. The strip may be galvanized or painted on one or both sides prior to forming and welding, or the outer surface of the welded seamed tube may be galvanized by immersing the tube in a molten zinc bath. Where the strip is coated with a protective coating prior to seam welding, the coating on the seam area will burn-off or vaporize because the welding operation involves the melting of the tube material, which is generally steel. The temperature of the adjacent edges of the open seam steel tube are heated to melting temperature of steel, which is 2300° F. or greater. Where the strip is coated with protective metal coating, such as zinc or aluminum, the protective metal coating will melt and vaporize during welding and the protective metal coating near the weld will flow away from the seam, which is located at the top of the tube in a conventional tube mill. Zinc coating solutions have also been used to "paint" the exterior surface of the seam. However, such coatings have poor adherence and are mainly cosmetic. "Metallizing" of the seam surface has also been attempted; however, such coatings are mainly mechanical and do not provide a metallurgical bond between the protective metal coating and the steel tube. The failure of the prior commercial processes to fully coat and thus protect the tube seam is evident by the fact that the welded area is generally the first to fail in accelerated corrosion tests. Metalized surfaces covering the exterior seam surfaces have been known to fail because of mechanical stresses associated with tube fabrication.

The improved method and apparatus for coating the interior seam surface of a welded tube of this invention assures complete coating of the inner surface of the seam of a welded metal tube and a metallurgical bond between the protective metal coating on the surface of the weld in a continuation or in-line process.

SUMMARY OF THE INVENTION

Where the metal strip or skelp which forms the tube (generally formed of iron or steel) is coated with a protective metal coating (usually zinc) prior to forming and welding the tube, it is important in the method of this invention to remove the metal coating from adjacent the weld area prior to welding to avoid galvanealing of the remaining zinc adjacent the weld which would prevent or inhibit the flow and the bonding of a zinc coating applied to the galvanealed surface. The presence of zinc and other protective metal coating at the surfaces of the metal tube to be welded may also inhibit or prevent the formation of a good weld between the adjacent edges of the open seam tube. Thus, the protective metal coating is thus conventionally removed or scarfed from the lateral edges of the strip prior to welding. In the process of this invention, it is also desirable to remove the coating from adjacent the weld to prevent vaporization of the coating or galvanealing. The preferred width of the exposed areas of the strip adjacent the lateral edges will depend upon the thickness and diameter of the tube, the speed of the line and the means used to heat the lateral edges during welding. Where the welding heat can be localized, the exposed areas can be relatively small. However, it is important to avoid formations of a substrate/coating alloy or galvanealing of the zinc adjacent the weld area to form a good metallurgical bond between the coating such as zinc applied to the interior surface of the weld area in the method of this invention.

The preferred method of coating the interior surface of the weld area with a protective metal coating of this invention may be utilized in combination with the method of coating the exterior surface in an in-line process or the methods may be used independently to coat either the interior or exterior surface of the weld. In the most preferred process of coating the interior surface of the seam, the tube is welded with the seam located in the lower portion of the tube, most preferably at or very near the bottom. However, it is also possible to weld the seam in the upper portion of the tube as is presently done in conventional tube forming mills and then "locating" the weld in the lower portion of tube during the seam coating process of this invention utilizing a conventional tube twisting apparatus, for example. In the most preferred method of coating the entire interior surface of the weld area of this invention, where the strip is precoated with a protective metal coating such as zinc, aluminum or their alloys, the lateral edges of the strip are pre cut to expose the edges of the tube to be welded and to form a well for receipt of the protective metal coating. The coating adjacent the weld should also be removed as described above. The protective metal coating on the strip may also be thicker adjacent to but spaced from the edges of the strip, such that the protective metal coating will melt and flow downwardly over the seam during the two stage heating of the method of this invention. During heating of the weld area in the lower portion of the tube to a temperature above the melting temperature of the metal coating, the coating metal adjacent the seam will melt and flow toward over the seam.

The method of this invention is particularly adapted to apply an adherent protective metal coating over the internal surface of a welded seam of a metal tube. The method and apparatus of this invention is particularly, but not exclusively, adapted to a continuous or in line tube forming process, wherein the strip or skelp is coated on at least one surface with a protective metal coating prior to forming and welding. Where the tube is formed of steel, for example, the protective metal coating is preferably formed of zinc, aluminum, copper, their alloys or other metals or alloys having a melting temperature substantially below the melting temperature of the tube material. Zinc is the most common protective coating for ferrous tubes which is generally alloyed with about 0.05% to 0.125% by weight aluminum. As described above, however, when the edges of the open seam tube are welded together, the protective metal coating in the weld area is burned off or vaporized, leaving exposed weld areas on the interior and exterior surfaces of the weld and the adjacent surfaces. Further, the remaining zinc on the surface of a ferrous or ferretic tube adjacent the weld is galvanealed forming an alloy of iron or steel and zinc produced by the extreme heat of the welding process. The galvanealed coating prevents or inhibits the application of subsequent zinc coating which is metallurgically bonded to the ferretic substrate.

The method of this invention includes applying a mixture of a protective metal coating in the form of a metal powder and a liquid flux over the internal surface of the welded seam with the welded seam located in a lower portion of the tube, preferably at the bottom of the tube. The powdered protective metal coating and liquid flux is preferably applied to the internal surface of the welded seam in the form of a paste, wherein the liquid flux is atomized by a nonoxidizing gas and sprayed over the surface of the weld. The powdered protective metal coating is preferably applied with the atomized liquid flux either through the atomizing nozzle or more preferably separately in a stream applied through the atomized liquid flux spray.

Following welding, the temperature of the tube, including the weld area, is preferably cooled to near ambient temperature as by quenching. The lower portion of the tube which includes the seam is then heated to the melting temperature of the protective metal coating, thereby melting the powdered metal coating over the welded seam. The preferred method of heating the welded seam includes first heating or preheating the seam area only to a first temperature which is less than the melting temperature of the protective metal coating and then heating the entire tube to a second temperature which is at least equal to the difference between the first temperature and the melting temperature of the protective metal coating. The seam area is thus heated to a temperature equal to or greater than the melting temperature of the protected metal coating, whereby the metal coating melts and firmly adheres to the seam area, protecting the internal surface of the seam area. The liquid flux assures even pooling of the melted protective metal coating and improves adherence of the coating over the seam wherein a metallurgical bond is preferably formed between the coating and the substrate. In the most preferred method of heating the seam to the melting temperature of the protective metal coating, the seam area is first heated by an induction heater located adjacent the seam to the first temperature followed by a "full body" induction heater having an induction coil which surrounds the tube and heats the weld area to the melting temperature of the protective metal coating. This method of heating is preferred, particularly in a continuous or in line tube welding process, because induction heating, particularly high frequency induction heating is very rapid and thus suitable for in-line processes. Further, this two step heating process prevents the powdered protective metal coating from being blown off the weld area by the flux lines of an induction heater as described below.

As described above, the preferred method of heating the tube with the two stage heating method in the process of this invention is by induction heaters. In the first stage, the induction heater is preferably located adjacent the weld area, most preferably by one or more induction heaters arranged generally tangential to the circumference of the tube in spaced relation to the tube. The seam area is preferably first heated to a temperature of between 100° F. and 600° F. or more preferably between 200° F. and 300° F. As described more fully hereinbelow, if the seam area were induction heated in this stage to a temperature greater than the melting temperature of the protective metal coating, the induction heater or heaters would repel the metal coating because the electromagnetic flux lines of an induction heater are radial. In the second stage of the heating process in the method of this invention, the entire tube is preferably heated with a full body induction coil, most preferably an induction coil which is spirally wound around the tube, wherein the electromagnetic flux lines of the full body coil extend axially relative to the tube, such that the powdered metal coating is not disturbed during heating.

The apparatus for welding and coating the interior surface of a metal tube with an adherent protective metal coating thus includes a welding apparatus, preferably an in line continuous welding apparatus, which heats the opposed adjacent edges of an open seam metal tube to the forging temperature of the metal tube and forges the heated opposed adjacent edges together to form a welded tube having a welded seam. In the most preferred embodiment of the apparatus of this invention, the welding apparatus is a high frequency induction welding apparatus which includes a conventional induction coil preferably surrounding the open seam tube and an impeder located within the tube extending axially through the open seam tube and the induction coil. The heated opposed adjacent edges of the open seam tube are then pressed together or forged by a roller preferably in a continuous process as the tube moves axially through the welding apparatus. It is also important in the method of this invention to keep the weld area substantially free of oxides including ferric oxides. This is accomplished in the preferred welding apparatus by enclosing and flooding the weld area with a nonoxidizing gas, preferably a noble gas such as Argon or Nitrogen.

The apparatus of this invention further includes a wand which applies the metal powder and liquid flux to the interior surface of the weld area following welding. More preferably, the tube is cooled to near ambient temperature, as by quenching, following welding. As will be understood, the weld area must cool to a temperature below the melting temperature of the protective metal coating before application of the metal coating. In a continuous or in line process, the wand extends between the opposed adjacent edges of the open seam tube in the welding apparatus and extends axially through the moving welding tube to overlie the welded seam located in a lower portion of the welded tube, preferably at or very near the bottom of the tube. The wand may also extend downstream from the weld temperature a distance sufficient to permit cooling of the weld. In the most preferred embodiment where the tube is welded by an induction heater including an impeder located within the tube, the wand extends axially through the impeder, which not only saves space in smaller diameter tubes, but also prevents heating of the wand to a temperature greater than the melting temperature of the protective metal coating. The wand is connected to a source of protective metal powder and a source of liquid flux to apply the coating to the internal surface of the weld.

In the preferred embodiment, the wand comprises a plurality of tubes or conduits including a first conduit connected to a source of powdered protective metal coating and a second conduit connected to a source of liquid flux. In the most preferred embodiment, the wand includes a third conduit connected to a source of nonoxidizing gas and the first conduit which transmits the powdered protective metal coating is also connected to a source of nonoxidizing gas such that the powdered protective metal coating is fluidized with a nonoxidizing gas through the first conduit. The preferred embodiment of the wand further includes an atomizing nozzle which receives the liquid flux and non-oxidizing gas which atomizes and sprays a mist of the liquid flux over the weld area. The powdered protective metal coating may also be connected to the atomizing nozzle and sprayed onto the weld area. However, it has been found impractical in certain applications using a conventional nozzle to spray the powdered metal and liquid flux together through the atomizing nozzle. Therefore, in the disclosed embodiment, the powered protective metal coating is directed in a stream through the atomized stream of liquid flux from the free open end of the first conduit. In this embodiment, the nozzle at the free end of the second and third conduits atomizes and sprays the liquid flux onto the weld area of the moving welded tube and a stream of powdered protective metal coating is directed through the spray onto the welded seam forming a paste-like mixture of liquid flux and powdered protective metal coating.

Finally, the apparatus of this invention includes a heater located adjacent the welded seam downstream of the wand which heats the powdered protective metal coating to the melting temperature of the protective metal coating. As described above, the heater preferably includes a first induction heater located adjacent the weld area which heats the powdered protective metal coating to a first temperature substantially less than the melting temperature of the protective metal coating and a second heater, preferably a full body induction coil surrounding the tube, which heats the entire tube to a temperature at least equal to the difference between the first temperature and the melting temperature of the protective metal coating. Where the protective metal coating and liquid flux is applied in the form of a paste and the seam is located in a lower portion of the tube, the protective metal coating thus remains on the seam during the two stage induction heating with the apparatus of this invention. When the temperature of the powdered protective metal coating reaches its melting temperature, the metal coating melts and flows over the internal surface of the weld area. Further, where the interior surface of the tube is also coated with a protective metal coating, the protective metal coating adjacent the weld also flows downwardly into the molten coating material added to the weld, metallurgically bonding to the added coating material and forming a continuous protected metal coating on the inside surface of the tube firmly adhered to and preferably metallurgically bonded to the internal surface of the metal tube.

Other advantages and meritorious features of the method of and apparatus for coating the interior surface of a welded seam of a metal tube with a protective metal coating of this invention will be more fully understood from the following description of the preferred embodiments of the invention, the claims and the drawings, a brief description of which follows.

DESCRIPTION OF THE PREFERRED EMBODIMENTS

As set forth above, the method of coating the internal surface of a welded seam of a metal tube with a protective coating of this invention may be used in a continuous or in-line tube forming process. The tube 20 as received by the process of this invention is an open seam tube having an opening between the opposed adjacent edges 24. In a typical tube forming mill, a flat metal strip or skelp is received by the tube forming mill, which is typically iron, ferrous or ferritic steel or stainless steel. It should be understood, however, that the coating method of this invention may also be utilized with non-ferrous metal tubes including, for example, brass. The metal strip is supplied to the tube forming mill in coils mounted on a payout reel (not shown) which is then treated, cleaned and rolled by conventional means into an open seam tube 20. In a conventional tube forming mill, however, the open ends of the tube are located at the top and the tube is welded with the seam located at the top.

Figure 2:
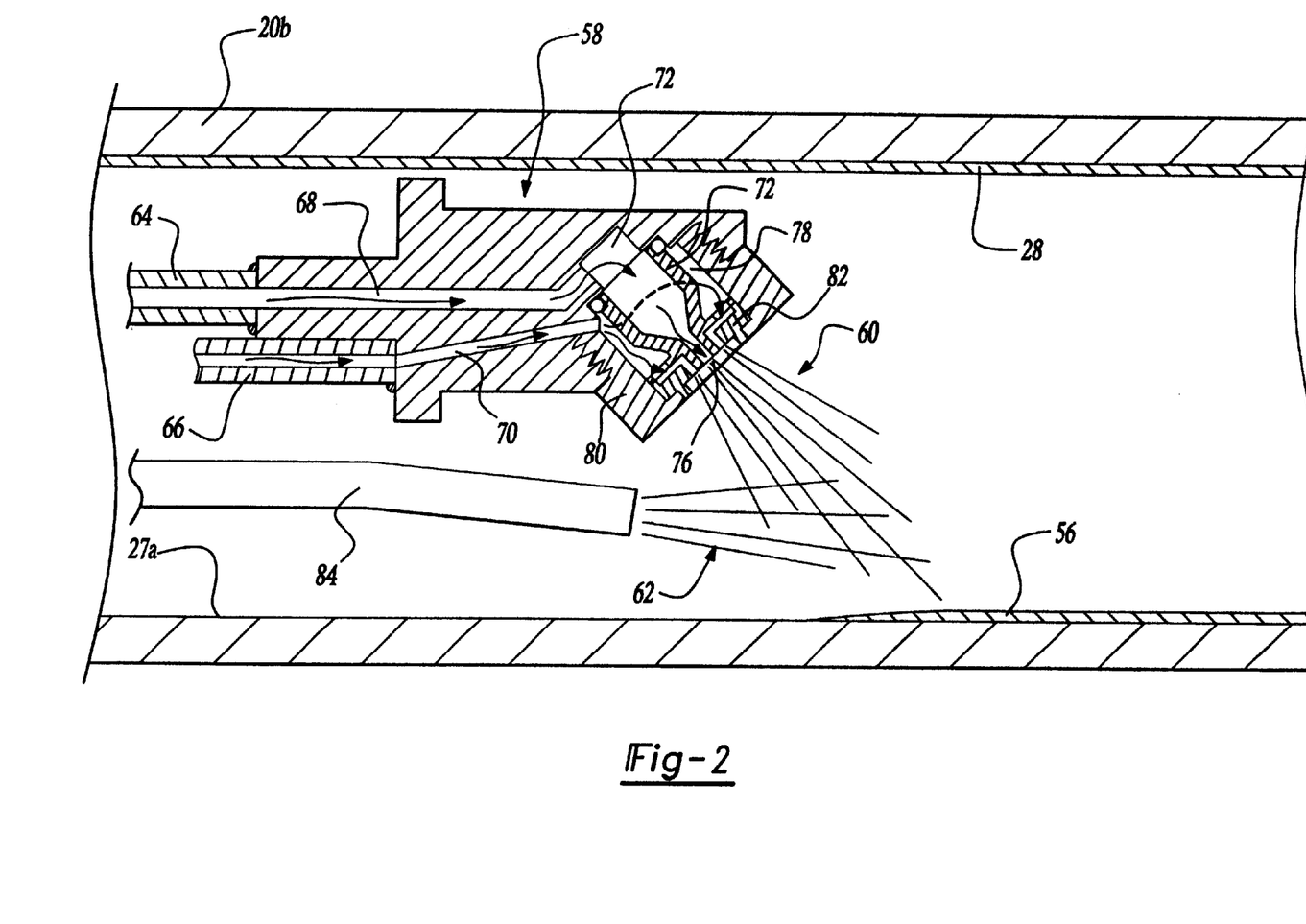
FIG. 2 is a side partially cross-sectioned view illustrating one preferred embodiment of the free end of the application wand.

The coating method of this invention may also be used with precoated metal strips having a protective metal coating on one or both surfaces of the strip having a melting temperature substantially below the melting temperature of the tube, including for example zinc, aluminum, copper, their alloys and other metals or alloys. Zinc is the most common protective coating for ferrous tubes. When zinc is used as the metal coating, it is typically alloyed with aluminum as described above. In the disclosed embodiment, only the internal surface 26 of the tube includes a protective metal coating 28 as shown in FIG. 2. As will be understood by those skilled in the art, the opposed edges 24 are preferably exposed and flattened prior to welding by removing the protective metal coating from the edges of the strip.

Figure 3:
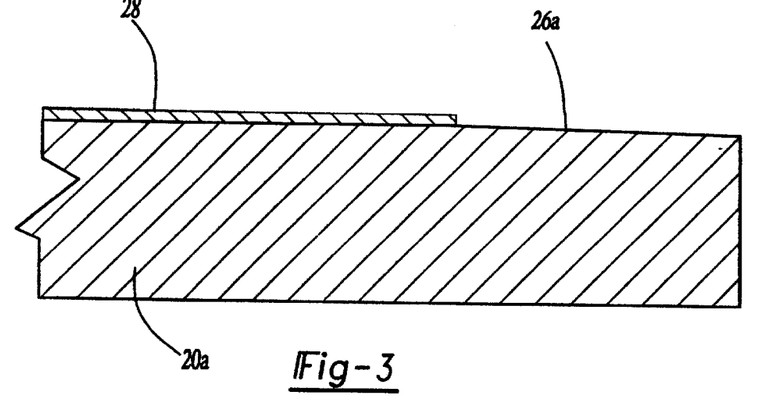
FIG. 3 is a side cross-sectional view of a coated metal strip wherein the protective metal coating has been removed from the lateral edge of the strip.

Further, in the preferred method of this invention, the protective metal coating adjacent the opposed edges 24 of the tube are preferably removed, leaving exposed substrate at both ends of the strip as shown in FIG. 3. FIG. 3 illustrates a preferred embodiment of the opposed lateral edges of the strip 20a before welding, wherein only one surface of the welded tube is to be coated with a protective metal coating. A protective metal coating 28 is applied to one surface of the strip 20a as described above. The protective metal coating is then removed from the lateral edge 24 to make the weld area suitable for welding as is well known in the art. However, in the preferred method of this invention, the protective metal coating is also preferably removed from the surfaces 20a adjacent the lateral edges 24 and the surface 26a is also slightly tapered toward the lateral edge 24 as shown in FIG. 3. The protective metal coating 28 is thus spaced from the later edge 24 to avoid melting of the protective metal coating during welding thereby preventing formation of an alloy between the metal substrate and the metal coating, such as an iron zinc alloy, at the extreme temperatures of welding, which would interfere with the adhesion of a coating applied to the interior surface of the tube, following welding. As set forth above, the preferred width of the exposed areas 26a of the strip adjacent the lateral edges 24 will depend upon the thickness and diameter of the tube, the speed of the line and the means used to heat the lateral of the open seamed tube during welding. In a typical application where the tube is welded with a high frequency induction welder, the protective metal coating is removed or scrapped from the surface 26a a distance of about 0.1" in width measured from the lateral edge 24, wherein the tube has a diameter of about 1.7" and a thickness of 0.045". The surface 26a is preferably tapered toward the lateral edge to provide a well for the weld flash as described below in regard to FIG. 4. The next step in the method of this invention is welding the open seam tube 20, preferably by induction welding using a high frequency induction heating apparatus. In a continuous or in line process, the open seam tube is transferred to the welding apparatus axially, in the direction of arrow 22.

In the preferred coating method of this invention, the open seam tube 20 is welded in a non-oxidizing atmosphere and it is particularly important to maintain a non-oxidizing atmosphere within the interior of the tube to promote bonding of the coating to the weld and reflow of the protective metal coating over the interior of the weld area. This is accomplished by enclosing the weld area within an enclosure 30 and injecting non-oxidizing gas into the interior of the tube. As used herein, a non-oxidizing gas or atmosphere refers to a gas or atmosphere which eliminates, prevents or inhibits oxidation of the molten metal including the molten edges of the tube and the coating. The non-oxidizing gas may include a reducing gas, wherein the reducing gas reacts with the metal oxides found on the metal strip at elevated temperatures, thereby effectively removing oxides from the strip surface in preparation for reflow of the metal coating. The non-oxidizing gas may also keep the metal oxides from forming at elevated temperatures. Thus, the gas or atmosphere may be relatively inert, such as argon or nitrogen, but may also include a reducing gas, such as hydrogen or hydrogen may be used as the non-oxidizing gas. The preferred nonoxidizing gas is argon. The atmosphere in the enclosure 30 should also be kept from reaching chemical equilibrium by allowing the non-oxidizing gas to escape the enclosure, preferably past the open ends of the strip.

In the disclosed embodiment, the open seam tube 20 is received through a gas seal 32 having an inner plug (not shown) formed of a friction resistant material, such as a thermoset plastic or ceramic including reinforced nylon which closely receives the open seam tube. A gas port 34 extends through the support portion of the plug body having an outlet which injects a non-oxidizing gas into the open seam tube. Line 36 receives a non-oxidizing gas under pressure from source 38. Line 40 is also connected to the source of non-oxidizing gas 38 to inject non-oxidizing gas into the enclosure 30. Thus, in the disclosed embodiment of the apparatus, the interior and exterior of the tube are maintained in a non-oxidizing atmosphere during welding.

Figure 1:
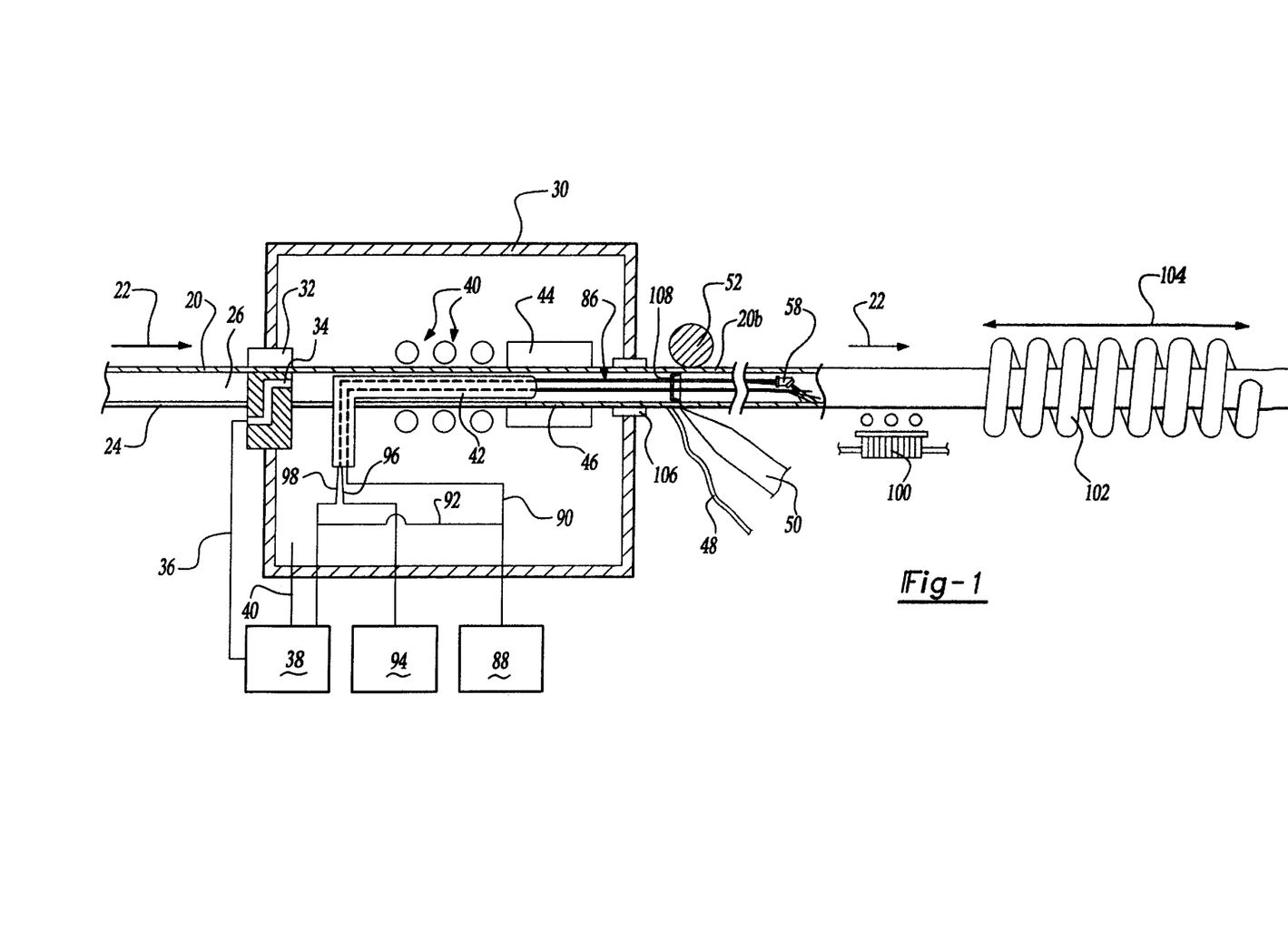
FIG. 1 is a partially schematic, partially cross-sectioned side view of a preferred embodiment of the apparatus of this invention.

The open seam tube 20 may then be welded by any conventional welding method while preferably maintaining a non-oxidizing atmosphere at least within the interior of the tube. In the preferred embodiment, the welding apparatus includes a work coil 40 which is connected to a source of high frequency alternating current (not shown). The work coil 40 creates a strong magnetic field, which in turn induces current in the open seam tube adjacent the work coil. An impeder 42 is located within the open seam tube 20. The impeder 42 extends upwardly between the opposed adjacent edges 24 of the open seam tube 20. A conventional induction welding impeder consists of a non-metallic tube surrounding one or more ferrite rods. Water or mill coolant is generally circulated over and past the ferrite rods to remove the heat produced by the magnetic hysteresis and eddy current losses. At the frequencies commonly used for induction welding (typically 200 to 800 kHz), current flows around the tube and along the "Vee" formed by the approaching edges 24 of the strip, heating the edges to a hot forging temperature, whereby the edges are at least partially melted. As will be understood by those skilled in the art, ferrous tubes are also being welded at lower frequencies down to 60 kHz. The lower the frequency, the wider the zone of the tube is heated. In the process of this invention, however, its is preferable to limit the zone heated above the melting temperature of the coating to reduce coating loss. Thus, higher frequencies are preferred. The edges are then forged together in the disclosed apparatus by opposed squeeze rolls 44, one of which is shown in FIG. 1, thereby forming an integral seam 46 which may include upstanding flash. Where the strip is steel, for example, the temperature of the edges of the strip will reach about 2300° F. to 2600° F. or greater during the welding step, vaporizing any protective metal coating such as zinc or a zinc aluminum alloy having a melting temperature from about 825° F. to about 875° F. at or adjacent the weld area.

Figure 4:
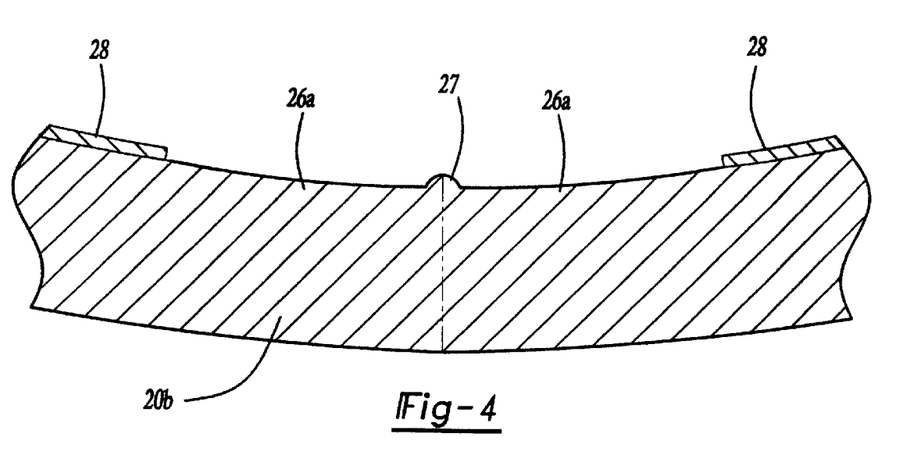
FIG. 4 is a partial side cross-sectional view of the weld area of a welded tube.

The outer welding flash 48 is conventionally removed by a scarfing tool 50 which is conventionally opposed by a roller 52. The outer welding flash 48 is preferably removed while the tube remains hot. FIG. 4 illustrates the seam area of a welded tube 20b following scarfing as shown in FIG. 4, the interior coating 28 has not melted because the welding heat was confined to the uncoated area 26a by using a high frequency induction welder. The upstanding weld flash 27 is located within the well created by the angled surfaces 26a reducing the required amount of coating material required to coat the flash 27.

Figure 5:
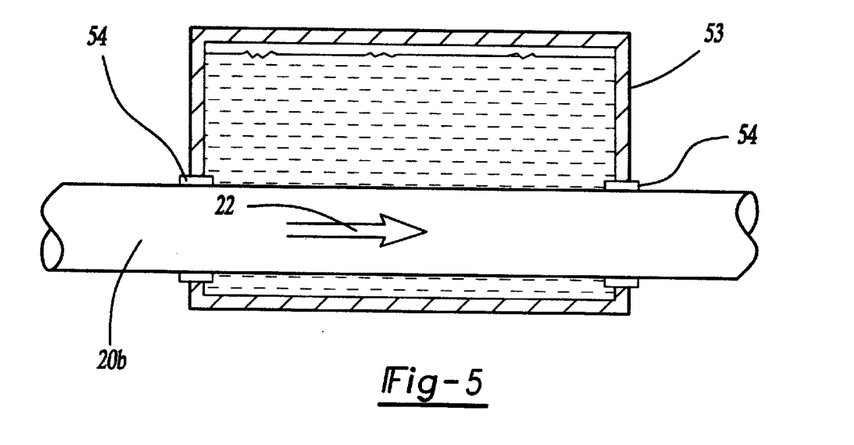
FIG. 5 is a schematic side elevation of a suitable quenching apparatus.

The tube may then be quenched with water to a much lower temperature, such that the temperature of the tube is at or near ambient temperature prior to application of the powdered metal coating and heating as described below. FIG. 5 illustrates one method of quenching the welded tube 20b following welding and scarfing. As shown in FIG. 5, the welded tube 20b may be immersed in a tank containing water or other quenching liquid and the tank is conventionally sealed at the inlet and outlet which receives the tube 20b by conventional liquid seals 27a.

The temperature of the seam area 26a and the entire tube is thus cooled to near ambient temperature. As will be understood, however, the requirement for a quench will depend upon the speed of the line and the distance between the welding apparatus and the application of additional protective coating on the interior surface of the welded seam described below and shown in FIG. 2.

FIG. 2 illustrates a preferred method and apparatus for coating the interior surface 27a of the weld area of the welded tube 20a. The cross-section of the welded tube 28 in FIG. 2 is through the weld area 27a which does not include any protective metal coating as described above. Further, because the tube 20b was welded in a nonoxidizing atmosphere, the weld area is substantially free of oxides. As described above, the preferred method of coating the interior surface 27a of the weld includes applying a mixture of a protective metal coating in powder form and a liquid flux preferably in the form of a paste 56 shown in FIG. 2. The seam area 27a is then heated to the melting temperature of the powdered protective metal coating as described below in regard to FIG. 1. Where the metal strip and thus the interior surface of the metal tube is precoated with a protective metal coating 28, it is desirable that the coating applied over the internal surface of the seam area 27a is metallurgically compatible with the interior coating 28. Thus, for example, where the tube 20 is steel and the protective metal coating 28 is zinc or a zinc aluminum alloy, the additional coating material 56 is also preferably zinc or a zinc aluminum alloy. The coating 56 over the interior surface 27a of the welding seam may, however, be different from the interior coating 28 in certain applications.

The apparatus shown in FIG. 2 includes a nozzle 58 which atomizes and sprays a relatively fine mist 60 of liquid flux and a stream of relatively fine particles of protective metal coating 62 is directed through the spray to apply the paste-like mixture 56 of powdered protective metal coating and liquid flux 56. In the disclosed embodiment, the liquid flux is transmitted to the nozzle 58 through tube or conduit 64 and nonoxidizing gas such as argon is transmitted to the nozzle through conduit 66. The nozzle 58 includes a center port 68 which receives the liquid flux from conduit 64 and a side port 70 which receives the nonoxidizing gas from conduit 66. The liquid flux is then received in a central liquid chamber 72 where it is received in the conical throat element 74 and discharged through central opening 76. The nonoxidizing gas is received in the annular chamber 78 in nipple 80 surrounding the conical throat element 74 and discharged through openings 82 directed across the discharge opening 76 of the liquid flux. The liquid flux is thus atomized by the nonoxidizing gas and discharged as a fine spray or mist 60 downwardly toward the internal surface 27a of the welded seam of the tube 20b. The stream 62 of the powdered protective metal coating in this embodiment is directed across the atomized spray 60 by conduit 84, applying a paste-like mixture 56 of powdered protective metal coating and liquid flux.

Various applicators and nozzle designs may be utilized in the method and apparatus of this invention provided a mixture of powdered protective metal coating and liquid flux 56 is applied to the interior surface 27a of the welded seam. The nozzle 58 may be formed of stainless steel or brass and the powdered protective metal coating may also be conveyed through conduit 66 with the nonoxidizing gas in certain applications and designs of the nozzle assembly. It has been found, however, that the nozzle may plug where the powdered protective metal coating is conveyed into the nozzle in certain applications. Where the powdered protective metal coating is zinc or a zinc aluminum alloy, a suitable particle size is 100 to 300 mesh which is conveyed through conduit 84 under 5 psi of argon which fluidizes the particles to direct a stream 62 of powdered protective metal coating into the atomized spray 60 of liquid flux. The liquid flux may be a conventional flux such as a solvent or water solution of zinc chloride available from Zaclon, Inc. under the trade name "Zaclon" or "Johnson Soldering Fluid" available from Johnson Manufacturing. The flow rate and pressures will depend upon the speed of the line and other conditions. However, a flow rate of 30 to 35 ml/min. of liquid flux through conduit 64 has been found suitable and a flow rate of 3 to 4 cubic feet per hour of argon through conduit 66 has also been found suitable.

Now referring to FIG. 1, it will be understood that the wand 86 comprises a plurality of conduits including a first conduit 84 conveying the powdered protective metal coating under pressure, a second conduit 64 conveying the liquid flux and a third conduit 66 conveying the nonoxidizing gas, preferably argon. The wand 86 is connected to a source 88 of protective metal coating in powdered form connected through line 90 to the wand 86. The source of nonoxidizing gas 38 is connected through line 92 to line 90 to fluidize the powdered protective metal coating. The wand is further connected to a source of liquid flux 94 which is connected to wand 86 through line 96. Finally, the source of nonoxidizing gas 38 is connected to the wand through line 98. As shown in FIG. 1, the conduits which comprise the wand 86 first extend between the opposed edges 24 of the open seam 20 and then axially through the tube to overlie the interior surface 27a of the welded seam of the tube 20b downstream of the welding apparatus where the temperature of the welded seam is substantially below the melting temperature of the protective metal coating. More preferably, the mixture 56 of powdered protective metal coating and liquid flux is applied to the interior surface 27a of the seam area when the seam is at or near ambient temperature. In the most preferred embodiment, the wand 86 extends axially through the impeder 42 of the welding apparatus. As described above, a conventional induction welding impeder consists of a non metallic tube surrounding one or more ferrite rods. Water or mill coolant is circulated over and past the ferrite rods to remove the heat produced by magnetic hysteresis and any current losses. Thus, extending the wand 86 through the impeder 42 not only saves space, which is important particularly in welding relatively small tubes, but also reduces heating of the wand during the welding step.

The next step in the method of applying a protective metal coating to the interior surface 27a of the weld area is heating the mixture 56 of powdered protective metal coating and liquid flux to the melting temperature of the protective metal coating. There are, however, several problems associated with heating a protective metal coating, particularly a powdered coating over the internal surface of the weld to the melting temperature of the metal coating. The first problem of applying the protective metal coating to the interior surface of the weld is solved by using a wand which extends through the open seam tube as described above. The second problem of retaining the coating over the weld is solved by locating the seam in the lower portion of the tube. Where the coating material is located in a lower portion of the tube and the coating is melted, the melted coating does not pull away from the weld area as in conventional tube forming processes where the welded seam is located at the top of the tube. The third problem is preventing the protective metal coating 28 applied to the strip from flowing downwardly and leaving exposed areas which would result from heating the entire tube to the melting temperature of the protective metal coating. Thus, the heating of the tube above the melting temperature of the protective metal coating must be confined to the weld area. The weld area must also be relatively free of oxides and zinc-ferrous alloys which would prevent bonding of the coating to the interior surface of the weld. Finally, the heating process must avoid driving the powdered protective metal coating from the interior surface of the weld which would result from an induction heater located adjacent the weld heating the powdered protective metal coating to its melting temperature, wherein the flux lines extend radially. The heating process must also be relatively rapid for an in line process.

The two-stage induction heating process and apparatus of this invention solves these problems and permits rapid heating of the powdered protective metal coating 56 in an in line welding process. The two-stage process and apparatus includes a first induction heater 100 which preheats the weld area to a temperature which is substantially less than the melting temperature of the protective metal coating, preferably to a temperature of between 100° F. to 600° F., more preferably to a temperature between 200° F. to 500° F. In a typical application where the protective metal coating material is zinc or zinc aluminum alloy, the seam area is heated to a temperature of between about 200° F. to 300° F. by the induction heater 100 located adjacent the weld. In the most preferred embodiment of the apparatus, the first induction heater is planar and extends parallel to a tangent through the weld area. In a second stage, the entire tube is heated by a full body coil 102 which surrounds the tube as shown in FIG. 1 and heats the weld area only to the melting temperature of the powdered protective metal coating. The indication coil 104 is spirally wound around the tube 20b, such that the flux lines 104 extend axially. That is, the first induction coil 100 preheats the weld area to a first temperature substantially below the melting temperature of the protective metal coating and the second coil 102 heats the entire tube to a second temperature which is equal to or slightly greater than the difference between the first temperature and the melting temperature of the powdered protective metal coating. The interior protective metal coating 28 (see FIG. 2) is thus maintained below the melting temperature of the protective metal coating, thereby avoiding melting of the protective metal coatings spaced from the weld area which would flow downwardly and leave exposed areas. The powdered protective metal coating 56, however, is heated to its melting temperature, causing the protective metal coating 56 to melt and flow over the interior surface 27a of the weld.

The function of the liquid flux sprayed onto the interior surface 27a of the weld area is not fully understood; however, a liquid flux has been found to be very desirable in this application. It is believed, however, that the powdered protective metal coating must include some oxide on the exterior surface of the metal particles. The flux then promotes melting and a metallurgical bond between the melted protective metal coating and the substrate at the internal surface 27a of the weld area. It has also been found that some of the protective metal coating 28 adjacent the weld flows downwardly over the weld area and the flux promotes this flow and a continuous metallurgical bond between the coating 28 on the interior surface of the tube and the protective metal coating added to the weld area. Thus, as set forth above, the added coating material is preferably the same or an alloy of the interior coating 28, such that the protective metal coating will be continuous over the entire interior surface of the tube.

Having described the preferred embodiments of the method and apparatus for coating the interior surface of a welded seam of a metal tube with a protective metal coating of this invention, it will be understood by those skilled in the art that various modifications may be made within the purview of the appended claims. The enclosure 30 enclosing the welding apparatus is preferably sealed by an exit seal 106 preventing flow of the nonoxidizing gas from the enclosure as shown in FIG. 1. Further, one or a plurality of butt plugs 108 may be used to support the wand 86 which also limits the flow of nonoxidizing gas through the interior of the tube. The lower margin of the tube adjacent the weld area may also be slightly flattened to limit the reflow of the interior coating spaced from the weld area. It is also believed that the weld area of the tube may be heated by other suitable heating means, including for example, high frequency and radiant heaters, although it would be more difficult to limit the heat to the weld area which is particularly advantageous to the method of this invention. The method of coating the interior surface of the weld area of this invention may also be used in conjunction with an exterior coating method as described in the above-referenced parent application. Finally, the method and apparatus of this invention may be used to coat the interior surface of a welded seam in metal tubes of various shapes including tubes having a square or rectangular cross-section and the tube may be welded by any conventional means, including AC or DC welding apparatus known in the art and flux welding. Having described the method and apparatus of this invention, the invention is now claimed as follows.

What is claimed is:

1. A method of applying an adherent protective metal coating over an internal surface of a welded seam of a metal tube having a melting temperature substantially greater than said protective metal coating, comprising the following steps:

atomizing a fine mist of a liquid flux over said internal surface of said welded seam and separately applying said protective metal coating in the form of a metal powder over said internal surface of said welded seam, forming a paste of said metal coating and said liquid flux on said internal surface of said seam; and heating said welded seam and said metal powder of said protective metal coating to a temperature above the melting temperature of said metal powder, thereby melting said metal powder over said welded seam.

2. The method of applying an adherent protective metal coating over an internal surface of a welded seam of a welded metal tube as defined in claim 1, wherein said method includes atomizing a fine mist of said liquid flux and separately directly a stream of powdered protective metal coating into said atomized fine mist of liquid flux over said internal surface of said welded seam with said welded seam located in a lower portion of said tube.

3. The method of applying an adherent protective metal coating over an internal surface of a welded seam of a metal tube as defined in claim 2, wherein said method includes atomizing said liquid flux within a nozzle with a non-oxidizing gas.

4. The method of applying an adherent protective metal coating over an internal surface of a welded seam of a metal tube as defined in claim 2, wherein said method includes directing a stream of said liquid flux into a nozzle and directing a stream of a non-oxidizing gas into said nozzle atomizing said liquid flux and forming said fine mist of said liquid flux.

5. The method of applying an adherent protective metal coating over an internal surface of a welded seam of a metal tube as defined in claim 2, wherein said method includes directing said stream of powdered protective metal coating under pressure of a non-oxidizing gas through a separate line into said atomized mist of liquid flux.

6. A continuous method of forming a welded metal tube having an interior protective metal coating adhered to an internal surface of said welded metal tube including said welded seam comprising the following steps:

coating at least one surface of a metal strip having opposed later edges with a protective metal coating spaced from said lateral edges;

forming said strip into an open seam tube with said protected metal coating on an interior surface of said open seam tube and continuously welding said lateral edges of said strip to form a continuous welded metal tube having a welded seam and an interior protective metal coating spaced from said welded seam;

continuously atomizing fine droplets of a liquid flux over said internal surface of said welded seam and separately applying said protective metal coating in the form of a metal powder over said internal surface of said welded seam forming a paste-like mixture of powdered protective metal coating and liquid flux over said welded seam with said welded seam located in a lower portion of said welded tube as said welded tube moves axially; and heating said welded seam and said protective metal coating in powder form above the melting temperature of said metal powder, thereby melting said protective metal coating over said welded seam.

7. The continuous method forming a welded metal tube having an interior protective metal coating as defined in clam 6, wherein said method includes separately directing a stream of powdered protective metal coating into said atomized droplets of liquid flux over said interior surface of said welded seam and forming said paste-like mixture of powdered metal coating and liquid flux over said welded seam.

8. The continuous method of forming a welded metal tube having an interior protective metal coating as defined in claim 7, wherein said method includes atomizing said liquid flux in a nozzle with a non-oxidizing gas.

9. The continuous method of forming a welded metal tube having an interior protective metal coating as defined in claim 7, wherein said method includes directing a stream of said liquid flux into said nozzle and directing a separate stream of non-oxidizing gas into said nozzle atomizing said liquid flux.

10. The continuous method offering a welded metal tube having an interior protective metal coating as defined in claim 7, wherein said method includes directing said stream of powdered protective metal coating into said droplets of atomized liquid flux under pressure of a non-oxidizing gas through a separate line.

11. The method of applying an adherent protective metal costing over an internal surface of an exposed welded seam of a metal tube as defined in claim 10, wherein said method includes directing a stream of non-oxidizing gas under pressure into said nozzle, atomizing said liquid flux.

12. The method of applying an adherent protective metal coating over an internal surface of an exposed welded seam of a metal tube as defined in claim 11, wherein said method includes directing said stream of powdered protective metal coating into said atomized liquid flux under pressure of a non-oxidizing gas.

13. A method of applying an adherent protective metal coating over an internal surface of an exposed welded seam of a metal tube having a melting temperature substantially greater than said protective metal coating, comprising the following steps:

separately spraying an atomized liquid flux and a protective metal coating in powdered form over said internal surface of said exposed welded seam forming a paste-like mixture of said liquid flux and powdered protective metal coating overlying said seam and;

heating said welded seam and said protective metal coating in powdered form to a temperature above the melting temperature of said protective metal coating, thereby melting said protective metal coating over said welded seam adhering to said exposed welded seam.

14. The method of applying an adherent protective metal coating over an internal surface of a welded seam of a welded metal tube as defined in claim 13, wherein said method includes atomizing and spraying a fine mist of said liquid flux through a separate stream of said powdered protective metal coating forming said paste-like mixture.

15. The method of applying an adherent protective metal coating over an internal surface of an exposed welded seam of a metal tube as defined in claim 13, wherein said method includes atomizing said liquid flux in a nozzle overlying said welded seam and directing a separate stream of powdered protective metal coating over said welded seam forming said paste-like mixture overlying said seam.

16. The method of applying an adherent protective metal coating over an internal surface of an exposed welded seam of a metal tube as defined in claim 13, wherein said method includes directing a stream of said powdered protective metal coating into said atomized liquid flux.

* * * * *